M. P. KIMBALL.
Railway-Car Brakes.

No. 156,737. Patented Nov. 10, 1874.

WITNESSES:

INVENTOR:
M. P. Kimball
BY
ATTORNEYS.

UNITED STATES PATENT OFFICE.

MOSES P. KIMBALL, OF RANDOLPH, MASSACHUSETTS.

IMPROVEMENT IN RAILWAY-CAR BRAKES.

Specification forming part of Letters Patent No. 156,737, dated November 10, 1874; application filed April 4, 1874.

*To all whom it may concern:*

Figure 1:
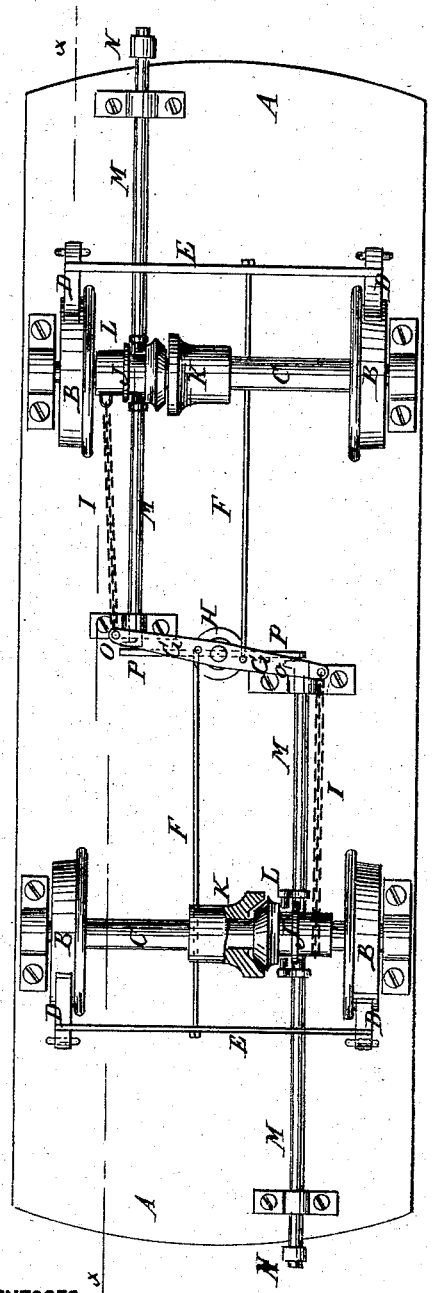
Figure 2:
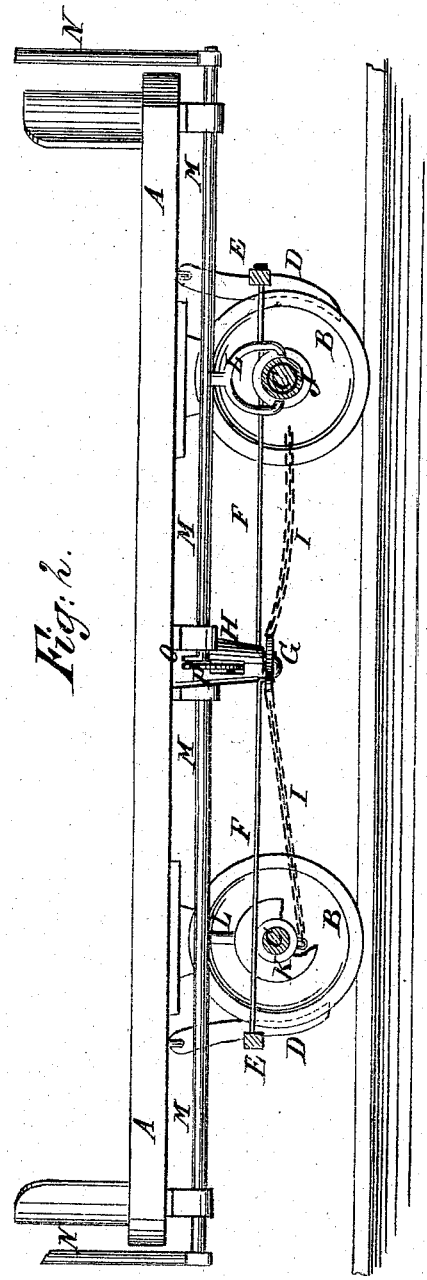

Be it known that I, MOSES P. KIMBALL, of Randolph, in the county of Norfolk and State of Massachusetts, have invented a new and useful Improvement in Friction Device for Applying Car-Brakes, of which the following is a specification:

Figure 1 is a bottom view of a car illustrating my invention. Fig. 2 is a longitudinal section of the same, taken through the line $x$ $x$, Fig. 1.

Similar letters of reference indicate corresponding parts.

The invention will first be fully described, and then pointed out in the claim.

A represents the frame-work, B the wheels, and C the axles, of a car, about the construction of which parts there is nothing new. D are the brake-shoes, and E are the brake-bars, which are suspended from the frame A in the ordinary way. F are the brake-rods, the outer ends of which are attached to the brake-bars E, and the inner ends of which are attached to the lever G upon the opposite sides of and equally distant from its pivoting-point. The lever G is pivoted at its center to a stud or bracket, H, attached to the frame-work A of the car. To the ends of the lever G are attached the inner ends of two chains, I, the outer ends of which are attached to two sleeves, J, through which the axles C pass, and which work loosely upon the said axle. Upon one end of the sleeves J is formed a part of a friction-clutch, the other part K of which is attached to and revolves with the axles C. By this construction, when the sleeves J are moved up to the clutch K, the said sleeves will be revolved by friction, and will wind up the chains I, applying both brakes. The sleeves J are moved into and out of gear with the clutches K by the forks L, attached to the rods M, and which work in ring-grooves formed in the said sleeves J. The rods M rock in bearings attached to the frame-work A, and to their forward ends are attached levers N, which project upward at the front of the platforms of the cars, so that they can be conveniently reached and operated by the brakeman. Upon the inner ends of the rods M are formed short cranks O, to which are pivoted the opposite ends of a short connecting-bar, P, which passes through a guide-slot in the stud or bracket H, so that both the clutches may be moved into and out of gear at the same time, by the same movement, and from either end of the car.

If desired, the friction device, instead of being placed upon the axles C, may be pivoted to the frame-work A, and may be connected with the axle by a pulley and chain, so as to receive motion from said axle.

Having thus described my invention, I claim as new and desire to secure by Letters Patent—

The combination, with clutch-sleeve J, of the rocking rods M, having short cranks O, pivoted bar P, and levers N, as and for the purpose specified.

MOSES P. KIMBALL.

Witnesses:
JOHN TWOMBLY,
H. H. BRYANT.